United States Patent
Kielsmeier

[11] 3,961,077
[45] June 1, 1976

[54] PASTA FILATA CHEESE PRODUCTION BY STORED CURD PROCESS

[75] Inventor: Lester O. Kielsmeier, Wheatridge, Colo.

[73] Assignee: Leprino Cheese Manufacturing Company, Denver, Colo.

[22] Filed: Apr. 10, 1975

[21] Appl. No.: 566,708

Related U.S. Application Data

[63] Continuation-in-part of Ser. No. 407,808, Oct. 19, 1973, abandoned.

[52] U.S. Cl. .................................. 426/36; 426/582
[51] Int. Cl.[2] ........................................ A23C 19/02
[58] Field of Search ................... 426/36, 37, 38, 40, 426/582

[56] References Cited
UNITED STATES PATENTS
3,531,297   9/1970   Kielsmeier et al. .................... 426/36

OTHER PUBLICATIONS
F. Kosikowsky, The Manufacture of Mozzarrelle Cheese from Pasteurized Milk, J. Dairy Sci. 34, 641–648 (1951).

*Primary Examiner*—Raymond N. Jones
*Assistant Examiner*—R. A. Yoncoskie

[57] ABSTRACT

Pasta filata cheese is prepared by a process in which the cooked granular curd is held in a cold storage room prior to the mixing and stretching, which imparts the typical pasta filata stringiness to the cheese product. The process preferably uses a starter culture providing S. thermophilus and a high-temperature-growing Lactobacillus, the cooking of the curd-whey mixture at a temperature favoring the growth of these bacteria with a resulting reduction of the internal pH of the curd, separating the warm curd, contacting it with cool water, and holding the cooled curd under cool ambient conditions until the internal pH of the curd has decreased to a pH suitable for mixing. The process also preferably involves blending curd from a plurality of separate batches prior to said mixing and stretching step.

17 Claims, 2 Drawing Figures

FLOW CHART FOR PASTA FILATA CHEESE PRODUCTION BY STORED CURD PROCESS

FLOW CHART FOR PASTA FILATA CHEESE PRODUCTION BY STORED CURD PROCESS

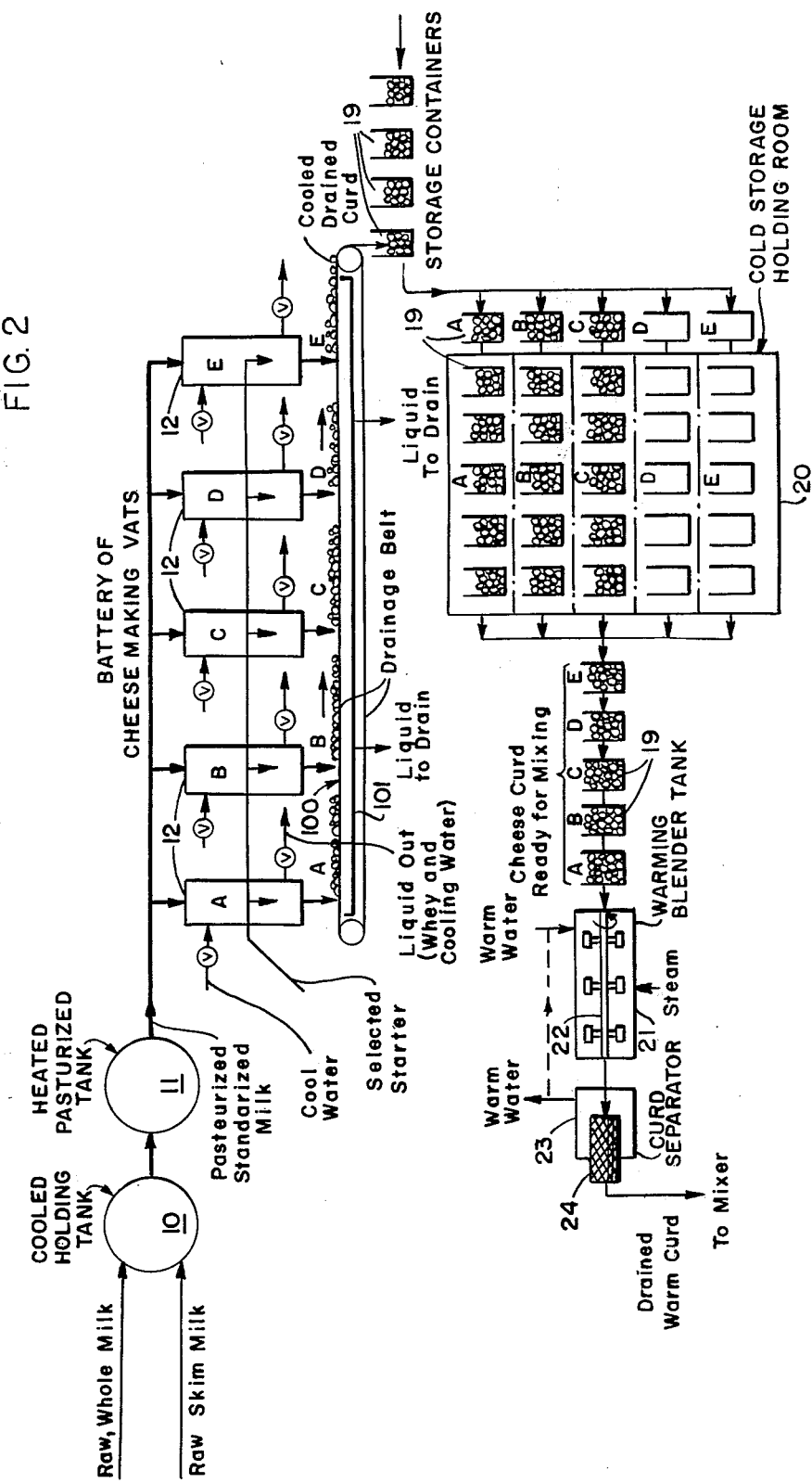

PASTA FILATA CHEESE PRODUCTION BY STORED CURD PROCESS

CROSS-REFERENCE

This application is a continuation-in-part of my copending application Ser. No. 407,808, filed Oct. 19, 1973, and now abandoned.

BACKGROUND AND SUMMARY

The term "pasta filata" as used in this application is intended to cover Italian cheeses which are characterized by a stringy texture, and are used particularly in Italian-style cookery to make pizza, lasagna, etc. The pasta filata cheese include Mozzarella, Scamorza, and Provolone. All of these cheeses are characterized by pasta filata stringiness, the principal difference being in the moisture content of the cheese. For example, under the existing standards of the U.S. Department of Health, Education, and Welfare, Food and Drug Administration, provolone cheese must contain not more than 45% moisture. The terms "Mozzarella" and "Scamorza" are used interchangeably. These are two types under the U.S. standards, namely, "regular" and "high-moisture" Mozzarella or Scamorza. The regular Mozzarella (Scamorza) has a moisture content of more than 52% up to 60%, while the low moisture Mozzarella (Scamorza) has a moisture content of about 45% but not more than 52%.

Mozzarella or Scamorza cheese prepared from whole milk must contain not less than 45% fat on a solids basis, which is also the requirement for Provolone cheese. Part-skim Mozzarella or Scamorza must contain not less than 30% fat up to 45%. The term "pizza cheese" refers particularly to low moisture Mozzarella or Scamorza, and may be made from either whole milk or part-skim milk. Commercially, however, most pizza cheese manufactured in the United States is part-skim, low moisture, Mozzarella cheese.

The traditionally Italian process for producing Mozzarella or Scamorza cheese, which is still practiced in Italy, and to some extent in the United States, utilized raw cow's milk (or buffalo milk) as the starting material without pasteurization or the addition of a starter culture. The cheese maker relied on the indigenous and variable content of lactic acid-producing-bacteria in the milk. When sufficient acidity was not obtained in a reasonable holding time in the cheese vats, the acidity of the milk batch was lowered by the addition of vinegar. Following the formation of the curd, and the draining of the whey, the curd was washed with cold water, and collected in bundles for ripening. When held under refrigerated temperatures, little if any ripening occurred, and this permitted the curd to be removed from the cold storage holding, and held at a warmer temperature as desired, to produce curd ready for the hot water mixing and stretching treatment. For example, the curd could be prepared at a separate plant, kept under refrigeration there, and on order, sent to smaller mixing plants, where it was held at a warm temperature until the internal pH of the curd was low enough to permit the mixing and stretching to be effectively carried out. In this traditional process, as just described, the two-stage holding of the curd, first at a lower storage temperature and then at a high ripening temperature usually required from 2 to 6 days. For continuous manufacture operations, therefore, the traditional process was disadvantageous.

Moreover, the desirability, and eventually the requirement, of using pasteurized milk made it necessary to add harmless lactic acid-producing-bacteria to the milk. Typically, such bacteria were lactic group *Streptococcus*, namely, *S. lactis* and/or *S. cremoris*. When such starter cultures were added and the curd was held, even under cold temperatures, the internal pH of the curd tended to drop below the desirable pH range for mixing and stretching. This problem was explored around 1950 by the Department of Dairy Industry, Cornell University, Ithaca, N.Y. The results of these investigations are reported in Kosikowsky, "The Manufacture of Mozzarella Cheese From Pasteurized Milk," *J. Dairy Sci.* 34, 641–648 (1951). The experimental results as reported by Kosikowsky confirmed the unsuitability of lactic acid starters for making Mozzarella cheese from pasteurized milk, where it was desired to hold the cheese curd under refrigerated storage prior to mixing. More specifically, the results showed that the pH of such curd held under refrigerated storage dropped to the range of 4.8 to 5.1 below the desirable pH range for mixing. On the basis of comparative tests, Kosikowsky proposed the use of a starter characterized by containing *S. faecalis* bacteria. With this starter culture, the pH of the curd stored under refrigeration remained at a pH well above effective mix pH's, namely at a pH about 6.0 to 6.1. This permitted the traditional procedure to be followed: holding the curd under refrigerated storage, and removing portions of the curd, as desired, for a second stage warm temperature ripening to reduce the pH to a mixing pH. In general, the optimum pH for mixing and stretching to impart pasta filata stringiness is in the range from 5.2 to 5.4.

Some Italian cheese manufacturers therefore utilized the *S. faecalis* starter proposed by Kosikowsky in making Mozzarella cheese at least for a short time, but the practice did not become prevalent. As far as is known, a *S. faecalis* starter has not been satisfactory for the continuous manufacture of pizza cheese. Instead, the practice has been to use mixed heat-resistant lactobacilli, such as *L. bulgaricus* or *helveticus*, and, also, the high-temperature-growing *S. thermophilus*. Lactic group streptococci (*S. lactis* and *S. cremoris*) also have been used by some cheese makers. (See Reinbold, *Italian Cheese Varieties*, p. 18, Pfizer Monograph, Vol. I, 1963).

In Kielsmeier U.S. Pat. No. 3,531,297, there is described a continuous process for the manufacture for pasta filata cheese, such as pizza cheese, using a mixed starter culture of *S. lactis*, *S. thermophilus* and *L. bulgaricus*. As described in this patent, the typical internal pH of the curd after cooking was around 6.0 to 6.2. The curd was then held in large water soaking tanks at a temperature of 100° to 120°F. until the internal pH of the curd has dropped to a desirable pH for mixing. This process has been found to be well adapted for continuous plant operation, particularly utilizing continuous mixing equipment, as described in Kielsmeier and Leprino U.S. Pat. No. 3,713,220. The Kielsmeier-Leprino process, although representing the best continuous prior art process for Mozzarella or pizza cheese known to applicant, involves certain processing disadvantages. However, prior to the present invention, little or no further progress has been made in improving the continuous manufacture of pasta filata cheese.

In the Kielsmeier-Leprino process, the large curd soaking tanks add to the equipment and plant space costs, and the used soak water, which contains lactose, lactic acid and other substances, can add considerably to the waste disposal burden of an operating plant. Another practical limitation of the Kielsmeier-Leprino process is that the entire processing operation from the cheese vat to the mixer, must be carefully timed, sequenced, and carried out on a substantially continuous basis. In practice, this means that the operators of the plant must almost immediately carry out the mixing of the curd on the completion of the curd soak. It has therefore been recognized as a desirable objective to provide process improvements which would permit a greater separation of the curd preparation and mix stages. Another recognized objective has been to reduce the variation in the pizza cheese product from batch to batch, that is, to achieve a more uniform and consistent product. Therefore, one of the important advantages of the present invention, is that it not only permits a substantial separation of the curd preparation and mixing stages, but also facilitates the preparation of a more uniform product.

The improvement of the present invention are accomplished by means of a novel sequence of steps. In a preferred embodiment, these steps involve subjecting the pasteurized milk to the action of a selected starter culture, providing an effective amount of *S. thermophilus* and a high-temperature-growing *Lactobacillus*, cooking the curd at a temperature favoring the growth of *S. thermophilus* and *Lactobacillus* bacteria, and washing the separated curd with cool water. The resulting curd can be stored under a cool temperature without the curd pH dropping below the optimum mix pH, although the curd pH does decrease to a desirable mix pH under the cold storage conditions.

It appears likely that although the cold temperature storage of the curd substantially arrests growth of the lactic acid-producing-bacteria, the bacteria continue to elaborate some lactic acid by their normal metabolic processes. Further, since the growth of the bacteria is inhibited by the cold temperature and given the character of the bacterial population of the cheese at this point, a pH in the range of 5.1 to 5.5 can readily be obtained. In preferred embodiments of the process, the pH during cold temperature storage of the curd drops within 24 hours to an optimum mix pH of substantially 5.2 to 5.4, and remains substantially stabilized in the range, permitting the curd to be processed without further holding or held for a longer time before mixing. Such overnight (12–24 hours) or variable holding makes it easier and more convenient to separate time schedules for preparing curd from the time schedules for mixing curd. However, long holding, such as for one or more weeks, is not needed. Other objects and advantages will be discussed in the following detailed specification.

DRAWING

Accompanying this application are drawings identified as FIGS. 1 and 2, respectively, which comprise diagramatic flow charts illustrating two ways in which the novel processing steps of this invention can be adapted for the improved manufacture of pizza cheese, or other pasta filata-type cheese.

DETAILED DESCRIPTION

Figure 1:
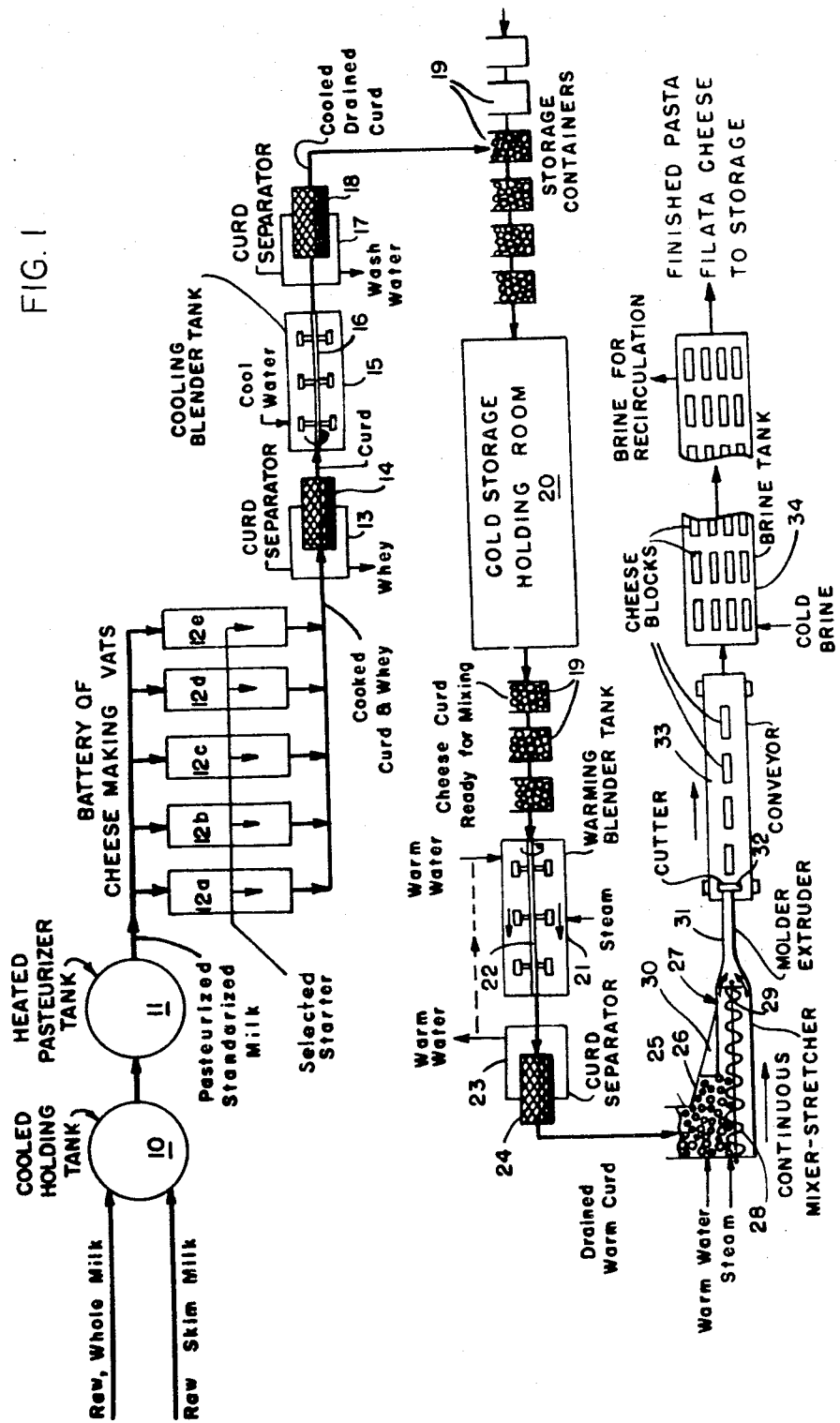

The present process may be employed for manufacturing a pasta filata cheese having typical pasta filata stringiness. The process will therefore involve mixing the cheese curd (at an appropriate mixing pH) for imparting a stringy characteristic to the completed cheese. The typical stringiness of pasta filata cheese manifests itself particularly on the melting of the cheese. The process of this invention is adapted to the continuous manufacture of Mozzarella cheese, such as the low moisture Mozzarella, commonly referred to as "pizza cheese." As used herein, the term "Mozzarella" is intended to comprise both Mozzarella and Scamorza cheese. In one preferred embodiment, the process is applied to the manufacture of part-skim, low moisture Mozzarella cheese.

The preferred starting material for the process is pasteurized cow's milk, which may be either whole milk or a mixture of whole milk and skim milk, or standardized milk fat withdrawn. In general, the fat content on a solids basis can range from 30 to 45% or higher, depending on the applicable standard. As in prior art processes, the pasteurized milk of a standardized fat content is introduced to one or more cheese-making vats. The milk is inoculated with a pasta filata starter culture providing bacteria elaborating lactic acid. Standard pasta filata starter cultures can be used. For the purposes of the present invention the starter culture preferably contains effective amounts of *S. thermophilus* and at least one high-temperature-growing *Lactobacillus*, such as *L. bulgaricus* and *L. helveticus*. The term "high-temperature-growing" as used herein designates bacteria which grow favorably at temperatures as high as 110° to 120°F. Other lactic-acid-producing bacteria may be present, such as Lactic group streptococci like *S. lactis* and *S. cremoris*. However, such bacteria are not essential and if present, are preferably used in a lesser amount than the high-temperature-growing bacteria. The most desirable selection appears to be a starter culture composed essentially of *S. thermophilus* in admixture with *L. bulgaricus* and/or *L. helveticus*. The relative amounts of *S. thermophilus* and the high-temperature-growing *Lactobacillus*, on a viable cell count basis, can range from 85% *S. thermophilus* to 15% *Lactobacillus* to 35% *S. thermophilus* to 65% *Lactobacillus*. However, preferred proportions are 80–45% *S. thermophilus* to 20–55% *Lactobacillus*, such as *L. bulgaricus*, *L. helveticus*, or mixtures thereof.

After the inoculation of the milk, the curd making process is carried out in the usual way, including the usual steps of ripening, setting, and cutting. The combined result of such vat processing steps is to convert the milk to a mixture of curd and whey ready for cooking. With respect to the vat procedures such as ripening, setting and cutting, reference may be had to existing literature. (See for example, Reinbold, Italian Cheese Varieties, p. 18–19 Pfizer Monograph, Vol. I, 1963).

After cutting of the curd, the mixture of the granular curd and whey is cooked. Cooking temperatures of about 100° to 125° can be used. Preferably, the cooking temperature is selected to favor the growth of the *S. thermophilus* and the *Lactobacillus* bacteria of the starter culture. Temperatures in the range of about 105° to 120°F. usually favor the combined growth of such bacteria. However, the specific cooking temperature is a means for adjusting bacterial growth and lactic acid formation, so the optimum temperature may vary from batch to batch. Cooking times range from 15 to 45 minutes, being also adjustable by the cheesemaker, but usually a cooking time of 20 to 30 minutes is satisfactory. Where it is desired to lower further the pH of the curd, the cooking time can be prolonged, continuing to use temperatures favoring the growth of the *S. thermophilus* and *Lactobacillus*. At the conclusion of the cooking, the curd and whey are separated. The granular curd is not subjected to cheddaring, using such steps as dipping, piling, milling, etc., and therefore remains in granular form for further processing by the method of this invention.

On completion of the cooking, the internal pH of the curd may be lower than in prior practice, although the pH can range from 5.5 to 6.2. For example, the pH of the curd at this point may be 5.6 to 5.9, and will usually at least be lower than 6.0. The pH will be above the maximum desirable mix pH of 5.4.

The separated granular warm curd is contacted with water at a lower temperature than the curd to reduce the temperature of the curd. For example, the temperature of the water may range from 35° to 80°F., such as below 70°F. In some embodiments very rapid cooling can be achieved with water below 55°F. However, with water at 80°F. or lower, the curd temperature will be substantially decreased, the lower limit being the temperature at which the water is maintained. Consequently, the curd can be cooled to at least 80°F. and preferably below 70°F. The curd may be cooled to 60°F. or lower during the water contacting of the curd, but this much cooling is not essential.

The water contacting of the curd may also perform the function of washing the curd. Such washing of the curd could extract buffer salts and other compounds, which might have a buffering effect on pH changes, as caused by lactic acid formed by the bacteria as they metabolize. The internal pH of the water cooled curd will usually be 5.5 or above, and may range up to the pH of 6.2. Such curd is not ready for mixing. The operable pH range of the water cooled curd is 5.5 to 6.0 ± 0.05 pH units. The required additional pH drop to the typical mixing range of 5.2 – 5.4 is obtained in the cold storage holding.

The washed granular curd is transferred to storage holding, which typically will be cold storage room. The temperature of the curd may be further reduced at the beginning of the cold storage holding to the storage room temperature. In the holding of the curd, it is not desirable to freeze the curd, and therefore the air temperature of the holding room or zone should be above the freezing temperature of the curd. The temperature of the air in the storage room will normally be maintained below 65°F., and preferably below 60°F. Corresponding temperatures of the curd can be obtained if the holding is sufficiently prolonged, but this is not essential. Air temperatures in the range of 35° to 55° F. are usually advantageous. During storage the curd remains in a loose granular form, and is preferably held in containers or drums of a size which can be readily handled.

One of the advantages of the process is that the holding time can vary, the cold storage room, in effect, providing a variable length interruption between the first stage of the process in which the curd is produced, and the second stage of the process in which the curd is mixed. The curd is held under the cold storage conditions until the internal pH of the curd has decreased to a pH below 5.5 suitable for mixing and stretching the curd to obtain pasta filata stringiness, such as a pH of 5.4 down to 5.1. This pH drop indicates that some additional lactose is being consumed by the bacteria, which is advantageous in producing a low lactose pizza cheese. The minimum holding time will depend upon the rate at which the pH drops during storage, but with the processing steps as described above, it appears that holding times as short as 8 to 12 hours can be used. Since with the process steps of the present invention, the pH of the curd tends to stabilize at a desirable pH for mixing, the cold storage holding could be prolonged for periods of 48 to 72 hours or longer, although normally the holding time will be in the range of 12 to 30 hours. This permits overnight and/or 1-day holding, which can provide efficient integration of the first and second production stages, without requiring an excessively large cold storage room. If desired, the curd produced as described above may be shipped under cold storage conditions, such as by refrigerated railroad cars, to another plant for preparation of the final cheese product.

While curd can be mixed at pH's down to 5.1, the preferred mixing pH's are substantially 5.2 to 5.4. It is therefore an extremely favorable feature of the process that the pH in cold storage tends to drop to an optimum stretch pH namely, to a pH of about 5.3 ± 0.05 pH units.

On the completion of the cold holding, as marked by the appropriate drop in pH to a mixing pH, the granular curd is ready for further processing. To prepare the curd for mixing, it is desirable to increase the temperature of the curd by contacting it with warm water, and then transferring the curd to a mixer unit, which may be of the kind described in the Kielsmeier-Leprino U.S. Pat. No. 3,713,220. This operation is facilitated by the granular form of the curd. Further details of the second stage of the process will be described below in connection with the flow chart example.

FIG. 1 FLOW CHART

Looking first at the plant flow chart of FIG. 1, there is shown a holding tank 10 for receiving the milk to be processed, which as indicated, may be raw whole milk or a mixture of whole milk and skim milk. The raw cow's milk is passed to a pasteurizer tank 11. Where required, the fat content of the milk can be adjusted, as by the use of a centrifugal separator to remove part of the cream or by the addition of more skim milk to lower fat content. The milk is charged to a plurality of cheese-making vats. In the illustration given, there is shown a battery of five cheese making vats (12a–12e). Two or more vats may be charged with milk at one time, but usually the processing of the cheese in the vats will be carried out sequentially. Timing will be such that at least two and usually three vats will be ready to discharge the mixture of curd and whey within a period of time of ½ hour to 2 hours thereby permitting curd from more than one vat to be processed together, as will be subsequently explained.

In the cheese vats, a selected starter culture is added, as described above. For the purpose of the present invention, it is important that the starter contain an effective amount of *S. thermophilus* and a high-temperature-growing *Lactobacillus*. The milk is then carried through the usual steps of ripening, setting, and cutting. The mixture of cut cord (curd granules) and whey in the vats is then subjected to cooking. It will be understood that the vats 12a–12e are provided with means for heating the contents thereof, and with means for stirring the milk and/or curd-whey mixture in the vats. For the purpose of the present invention, cooking temperatures are preferably employed which are favorable to the growth of the high-temperature bacteria. In general, the time and temperature for the cooking step are those which have already been described.

On the completion of cooking, the curd-whey mixture is transferred (pumped) to a curd separator, including a rotating screen 14 mounted above an open-top tank 13. The whey drains through the screen 14 into the tank 13, and the curd is transferred to the feed end of a cooling blender tank 15. This tank is equipped with a shaft mixer having a plurality of spaced mixing arms. Cool water is introduced to the tank 15 to maintain the granular curd in suspension, and cooling the curd as it is intermixed. At the same time extracting buffer components from the curd can take place. Tank 15 is preferably of sufficient size so that it can contain at least two, and preferably, three batches of curd at the same time, that is, curd from at least two or three of the cheese vats. With this arrangement, the curd is effectively cooled in the tank 15, so that a curd blend is produced which comprises curd from a plurality of batches.

The residence time of the curd in blender tank 15 can range from 10 minutes to 2 hours. For example, the blender tank can have a capacity equal to two to three batches of cheese. In other words, the blender can hold the cheese curd from several cheese vats, and preferably is capable of holding curd from at least one and one-half vats and may be extended to hold curd up to three to four vats. Conveniently, the capacity of tank 15 may equal about two to three batches. As will be appreciated, the residence time will then be dependent on the rate at which the cheese vats are timed to complete preparation of the curd and the transfer of the cooked curd to tank 15. A new batch of curd may be introduced into the blender tank every 10 to 60 minutes, but a typical schedule would be to introduce a new batch of curd at intervals of about 30 to 45 minutes. These conditions, however, are not particularly critical, providing the curd is sufficiently cooled. While the blending of curd from several batches is desirable in tank 15, additional blending can be obtained in tank 21, as will be subsequently described.

It is not necessary to operate blender tank 15 with fresh wash water. During a days operation, such as over 8 to 12 hours, the water can be recycled, that is, water can be removed from tank 15, subjected to heat-exchange cooling, and returned to tank 15. The increase of lactose and other dissolved solids in the recycled water, such as salts, has not been found to be objectionable, or to interfere with the further processing of the curd. It appears feasible, if desired, to use cooled whey as the cooling medium in tank 15, although it is preferred to operate with water, starting the operation in the morning with fresh water, recycling the water during the days run, and then discarding the water on shut-down at the end of the day.

After the curd has been sufficiently cooled and blended, it is removed from the discharge end of the tank 15 and transferred (pumped) to a curd separator, including a rotating screen 18 and an underlying water collection tank 17. The wash water drains through the screen 18 and is removed from the tank 17, while the cooled drained curd is introduced into a series of storage containers 19. The containers 19 filled with the loose, granular curd blend are transferred to a cold storage holding room 20. In room 20, the containerized curd is held at the temperatures and for the times previously described.

Even though the curd is drained, such as in the curd separator 17, 18, it will still contain substantial water as introduced into the storage containers 19. This water will bleed out of the curd and be present within the storage containers as external water. Preferably, the water is drained out of the storage containers while the curd is in the cold storage holding room 20. This can be accomplished by a suction-type dip tube, which can be inserted into the containers down to the bottom thereof, sucking out the free water, and leaving curd of reduced water content. Such water removal, however, is not essential for the process, although it is believed to be advantageous in the further handling and processing of the curd.

After the pH of the stored curd has dropped to a desirable pH for mixing, the containers 19 may be removed from the cold storage room and dumped into the feed end of a warming blending tank 21. Warm water is supplied to the tank 21 and also, as required, steam is injected to maintain the desired temperature. The water suspends the granular curd within the tank 21, and the tank is provided with a rotating shaft mixer 22. Preferably, tank 21 is sufficient size to permit curd from a plurality of different batches, or different blends of batches, to be introduced and mixed within the tank 21 at one time. This mixing thereby further promotes blending, and thereby increases the uniformity of the curd blend. On the completion of the warm-up, the curd-water mixture is transferred (pumped) to a water separator, including a rotating screen 24 and an underlying water collection tank 23. The water drains through the screen for removal from tank 23, and the drained warm granular curd is introduced into a continuous mixer-stretcher apparatus, including a feed tank and portion 25, a downwardly converging section 26, and a section of restricted cross section 27. Along the bottom of the mixer-stretcher, there is provided a rotating screw conveyor 28. Heated water is maintained within the mixer, and provision is made for introducing steam to maintain the most desirable temperature for mixing and stretching the curd.

As described in the Kielsmeier-Leprino U.S. Pat. No. 3,713,220, conveyor 28 moves the curd toward the discharge end of the mixer, while permitting some recirculation within the converging section 26. At the exit end of the restricted section 27, there is provided a back-pressure plate 29, which controls the pressure within the mixing section of the unit. The mixed curd flows around the outside of the back pressure plate 29 into a mold-extruder tube 31. For further details concerning the operation of the mixer-stretcher apparatus, reference should be made to the cited prior U.S. Pat. No. 3,713,220.

The mixed stretched curd may be formed into curd blocks in various ways. In the illustration given, the curd is extruded from the end of the molder tube 31 and the pieces are cut to length by a cutter 32. The cut cheese blocks are shown being deposited on a conveyor belt 33 for transfer to a chilling and brine soaking tank 34. With such a system, for purpose of firming and salting the cheese blocks, they may be removed from the discharge end of the conveyor 33 and deposited in transverse rows across tank 34 which is filled with a cold brine (water saturated with NaCl). The blocks float on top of the brine, and move along the top of the brine tank while they are being cooled and salted. The brine tank can be of sufficient length to combine the brining and cooling, permitting the cheese blocks to be removed from the discharge end of the brine tank ready for storage, which may include wrapping, slicing and packaging, and other procedures.

Advantageously, however, the molded curd blocks may first be chilled with cold water before being placed in the brine soaking tanks. With this arrangement, the conveyor 33 would be replaced by a water chilling tank containing cold water and the chilled curd blocks would be transferred to the brine soaking tanks, such as tank 34.

Certain types of pasta filata cheese, such as provolone, may be further processed by curing and/or smoking. However, pizza cheese, such as low moisture, part-skim Mozzarella cheese, is normally not cured.

FIG. 2 FLOW CHART

Referring now to the flow chart of FIG. 2, there is shown a modification of the plant operation described with respect to FIG. 1. For convenience of reference, the same numbers and labels have been used where applicable. It will therefore be understood that the description of these components and features are the same as with respect to FIG. 1. The features comprising an alternative method of practicing the present invention will now be described.

For clarity of description, the cheese vats 12 have been labeled A, B, C, D, and E. Similarly, the curd batch from each vat has been individually designated by these letters. This will facilitate the description of the handling of the curd, which is somewhat different than in FIG. 1.

The preparation of the cheese in the vats A-E is the same as described with respect to FIG. 1 through the cooking of the curd. On completion of the cooking, and after drainage of the whey, the granular curd is cooled within the cheese vats by the introduction of cool water. As indicated in FIG. 2, in addition to the valve-controlled liquid outlets, there are also provided valve-controlled liquid inlets which can be used to introduce the cool water. As shown, the liquid outlets can be used for removal of both the whey and the cooling water.

The temperatures of the cooling water are introduced into the vats A-E, may be the same as previously described. Advantageously, however, quite cold water at a temperature of about 35° to 50°F. can be used to achieve a rapid chilling of the curd. With as little as 5 to 10 minutes holding time, the curd can thereby be cooled to a temperature of 65 – 75°F. With a shorter holding time or higher cooling water temperature, the curd may be removed from the vat at a higher temperature, such as up to 80°F. It will be understood that the curd is desirably stirred in the cooling water, using the same stirring apparatus as used for preparing the curd, and that on completion of the cooling, the cooling water will be drained, leaving the drained, cooled curd in the vats. In general, the pH's of the curd of completion of cooking and following cooling can be the same as previously described. However, if desired, the cooking can be continued somewhat larger than with the plant arrangement of FIG. 1, the pH of the curd on completion of cooking being pH 5.5 – 5.6. Because of the rapid showing of the curd, the pH of the cooled drained curd will still be above the desirable maximum mix pH of 5.4. It is therefore important to use a cold storage holding procedure of the kind previously described.

For transport of the cooled curd, and to facilitate further drainage, the curd can be discharged from each vat onto a continuous drainage belt 100 which moves in the direction indicated by the arrows, and is arranged to permit the curd to be discharged, selectively, from each of the vats A–C onto the top of the belt. The movement of the belt may also be discontinuous.

For purpose of illustration, curd batches A, B, C, D, and E are shown being transported on the drainage conveyor belt 100. In practice, however, the vats would normally be discharged sequentially, and therefore belt 100 at any one time would contain entirely, or at least primarily, the curd from one vat. The drainage belt may be made of mesh, so that liquid can drain through the belt into a collection trough 101, from which it is removed to a drain for discharge, as indicated by the arrows. When the cooled drained curd reaches the end of the belt, it is introduced into the containers 19, as described with respect to FIG. 1. In this embodiment, however, the containers are preferably handled differently, separate storage areas being provided in the cold storage holding room 20 for the curd from each of the batches A–E. As indicated, the containers filled with the curd 19 from batch A can be introduced into section A of the holding room 20, the curd from batch B into section B of the holding room, etc. While this type of storage is not essential for the process of the present invention, it is advantageous where it is desired, as preferred, to blend the curd from a plurality of batches in the warming blender tank 21. For example, as illustrated, containers 19 having curd from a plurality of batches can be removed and passed in sequence to the blender tank 21. Thus, prior to mixing and stretching of the curd, the granular curd is blended from two or more batches to produce a curd blend. In preferred embodiment, curd from at least three batches can be blended in tank 21. Otherwise, the operation of blender tank 21 is the same as described with respect to FIG. 1. After warming and blending, the curd is removed from tank 21, and processed in the curd separator, 23, 24 to produce a drained warm curd which is passed to the mixer, such as the mixer 27 described in connection with FIG. 1. The rest of the processing can be the same as previously described.

Further, the air temperatures maintained in the cold storage holding room 20, and the pH dropped to a mixed pH while holding the curd in room 20 will also be the same as previously described. The process therefore, generically, involves separating the cooked curd which will have a temperature of at least 100°F. or greater, and, after the whey is removed, cooling the separated curd to a temperature of at least 80°F. The cooled curd is then stored in a cold storage room having an ambient temperature above the freezing temperature of the curd but below 65°F. until the average pH of the stored curd had reached the mix range of substantially pH 5.2 to 5.4. In addition, preferably, prior to the mixing and stretching of the stored curd, it is subjected to a blending operation in which curd from at least two batches are combined to produce a curd blend. In the embodiment of FIG. 1, curd from a plurality of batches can be subjected to blending both before and after storing in the cold storage room 20. In the embodiment of FIG. 2, the curd is stored in the cold storage room 20 without being blended with curd with another batch, but on removal from the cold storage room, it is advantageous to blend the curd from at least three batches to produce a blend for mixing and stretching.

EXAMPLE I

One embodiment illustrative of the process conditions of the present invention is as follows:

A batch of milk may comprise 10,000 pounds, which may be a mixture of whole milk and skim milk, which has been pasteurized and standardized. On being charged to the cheese vat, representative conditions would be a temperature of 90°F., pH 6.56, titratable acidity 0.16%, and 1.7% milk fat.

To the milk in the cheese vat, there is added 1 to 2% (e.g., 1.5%) (based on the weight of the milk) of admixed starter culture comprising 50–80% S. thermophilus with 50 to 20% L. bulgaricus. A major portion of S. thermophilus together with a minor proportion of L. bulgaricus is usually the most desirable such as mixtures containing from 3 to 4 parts S. thermophilus per each part of L. bulgaricus. The milk is permitted to ripen for about 30 minutes, and the curd is then set by adding a coagulating agent, such as rennet, a microbial coagulant, or a mixture of rennet and pepsin. For example, a mixture of rennet and pepsin may be added in the amount of 2 ounces per 1,000 pounds of milk.

The curd is then cut to pieces of approximately ¼ inch square, thereby producing a granular curd. The cutting time typically will be about 15 minutes. The mixture of curd and whey is then cooked, the cooking starting approximately 25 minutes after setting of the curd, and being continued for about 15 minutes at 114°–115°F. Approximately 1 hour after setting, 50% of the free whey is pumped out of the vat, and the remaining curd-whey mixture is removed after approximately 1¼ to 1½ hours after setting. The cooked curd can have an internal pH of about 5.7 to 5.9.

The granular curd is separated from the whey and cooled to about 55°F. by screening it into chilled water. As the curd is mixed in the water, curd from different batches can be added at this point to produce a curd blend. After chilling and extraction of acid and buffer salts from the curd, the curd or curd-blend is screened into containers, the wash water being removed, and the drained granular curd being thereby containerized for cold temperature storage. At this point in the process, the curd can have an internal pH of approximately 5.7 to 5.8, that is, substantially the same pH as when introduced to the washing tank.

The curd may be held in cold temperature storage, for 24 hours at 40°F. By that time, the pH of the curd will have dropped to approximately 5.3 to 5.4. The curd is then ready for mixing. If desired, however, it may be held longer. On the following day, the curd is pumped from the containers into a warming vat and brought up to a temperature of about 95° to 100°F. The mixture of granular curd and warm water may be separated, or the warm curd transferred to a mixer. In the mixer, the curd is kneaded and stretched to produce pasta filata stringiness. Satisfactory mixing can be obtained at temperatures as low as 135° – 140°F. Where the mixed curd is extruded through a tube, the tube may have a cross-sectional size approximating that desired for the finished cheese. This extrusion process will tend to produce a desirable "skin" on the outside of the cheese block, which can then be cut to length, and chilled in cold water to set the blocks before brine soaking. Alternatively, the cheese may be extruded directly into a brine tank, and cut to length after the cheese has been chilled and brined. With the latter arrangement, the initial brine can be maintained at about 10°F. for rapid chilling. Thereafter, the set cheese blocks may be contacted with a brine solution at a higher temperature, such as 32°F. for the brine soaking.

In another alternative, the mixed cheese may be extruded into standard molds, and the molds exposed to brine at 20°F., for 5 minutes, and thereafter the cheese may be removed from the molds. The dimensions of the cheese blocks are set as removed from the molds and these blocks may be subsequently exposed to brine of approximately 32°F. The equilibrated temperature of the brine tank, that is the temperature after an equilibrium of the warm cheese blocks and cold brine has been reached, should be kept below 60°F. and preferably below 55°F.

EXAMPLE II

Utilizing a plant flow sheet similar to FIG. 1, the processing conditions through the formation of the curd will be the same as described in Example I. The curd is then cooked at temperature of 105° to 120°F. On completion of the cooking, the curd will have a pH in the range of 5.6 to 6.2, the preferred pH being in the range of 5.8 to 6.1. The curd is then transferred to the cooling blender tank, such as the tank 15. The warm curd is mixed with curd from one or two other batches from different vats, while it is being contacted with water maintained at 53° to 70°F., such as, preferably, cooling water at about 60° to 65°F. This water may be recycled during a days operation of 8 to 9 hours. The pH of the water over the days operation may gradually decrease from a starting pH of about 6.8 to a pH at the end of the day of about 5.7. If necessary, an upward adjustment of pH can be obtained by adding fresh water at a pH of 6 – 7. In the handling of the vats, one batch may be dumped into the cooler blending tanks every 35 minutes, and the tank have a capacity equal to the curd from at least 1.5 vats up to 3 vats.

After the curd has been cooled to a temperature below 70°F., such as a temperature of 60° – 65°F., it is transferred to a cold storage room. At that point, the pH will be 5.5 – 5.6 ± 0.05. The curd is still not ready for mixing, and therefore is held in the cold storage room at an air temperature of 40° – 50°F. The holding is continued in suitable containers, which may be formed of plastic, for 10 to 24 hours. By that time, the pH of the curd will have dropped to the mix range of 5.2 – 5.4. Depending on the holding time, the temperature of the curd itself at this point may be approximately 60° – 65°F. Where the curd in the plastic containers has exuded free liquid, as will usually be the case, this liquid may be removed by suction devices without removing the granular curd from the containers. The rest of the process will be carried out as described in connection with Example I.

EXAMPLE III

Utilizing a plant set-up similar to the flow chart of FIG. 2, the processing of the milk to form pizza cheese is the same as previously described up to the cooking of the curd. The curd may be cooked at a temperature of 108° to 126°F., and the cooking continued until the pH of the curd has dropped to 5.5 to 5.6. At that point, the whey is drained from the curd, and cold water (35 – 40°F.) is introduced into the vat for rapid chilling of the curd. The temperature of the curd will be reduced to at least 80°F. in 5 minutes, and upon longer holding, the temperature may be further reduced. For example, the curd may be stirred in contact with the cold water for approximately 30 minutes, and discharged from the vat, after draining the cooling water, at a temperature of about 70° – 72°F. At that point, the pH of the curd will be 5.5 ± 0.05. The curd is still not ready for mixing, and is therefore transferred to the cold storage holding room. Preferably, the curd is handled as described in connection with FIG. 2, so that curd from different batches can be blended in the warming blending tank, such as tank 21. The curd may be held in the cold storage room at a air temperature of 40° – 50°F., such as an average air temperature of 42°F. for an average of 10 – 12 hours. The pH of the curd will then have dropped to the mix pH of 5.2 – 5.3. The temperature of the curd at that time, may average about 65°F. It is then transferred to a warming blending tank 21, where curd from a plurality of batches is blended, as previously described. The rest of the process is the same as that set forth in connection with Examples I and II.

It is believed that certain of the advantages of the pasta filata process of the present invention can be obtained in connection with the production of other kinds of cheese, such as Jack, Muenster, and Colby cheeses. In particular, the process features of using the cooler blending tanks, such as the tank 15 and/or the warming blending tanks, such as the tank 21 would permit a more uniform product to be achieved. As described above, curd from a plurality of batches can thereby be blended. Moreover, with respect to the production of other cheeses, as well as pasta filata, it is believed it will be advantageous to hold the curd in storage before further processing.

Still another feature of the present process is that with the blender tanks, such as the tanks 15, 21, salt (NaCl) or other additives may be introduced into and mixed with the curd. In this way, greater control of the characteristics of the cheese can be obtained, such as modification of pH, body characteristics, salt level, and flavor. In the production of pasta filata cheese, not only may salt be added in the blender tanks 15, 21, if desired, but salt may also be introduced into the water in the mixer. The addition of salt in the mixer reduces the time required for brine soaking of the molded cheese to obtain adequate salt levels.

I claim:

1. A process for preparing pasta filata cheese curd ready for mixing, comprising:
   a. inoculating a batch of pasteurized cow's milk with a pasta filata starter culture providing an effective amount of *S. thermophilus* together with at least one high-temperature-growing *Lactobacillus*;
   b. converting the milk batch to a mixture of curd and whey;
   c. cooking the curd-whey mixture at a temperature of 100° to 125°F. favorable to the growth of said *S. thermophilus* and said *Lactobacillus*;
   d. separating the resulting warm granular curd from the whey, said warm curd having an average internal pH of 5.5 to 6.2;
   e. contacting the warm curd with water having a lower temperature than the curd until the curd is cooled to below 80°F.; and
   f. holding the cooled granular curd in a cold storage room having an ambient air temperature above the freezing temperature of the curd and below 65°F. until the average internal pH of the curd has decreased to a pH of 5.1 to 5.4 suitable for mixing and stretching the curd to obtain pasta filata stringiness.

2. The process of claim 1 in which said starter culture contains *Lactobacillus* selected from *L. bulgaricus* and *L. helveticus*, and mixtures thereof.

3. The process of claim 1 in which said starter culture is composed essentially of a mixture of *S. thermophilus* and *L. bulgaricus*.

4. The process of claim 1 in which said warm curd is cooled by contact with said water to at least 70°F., and said cooled curd is held in said cold storage room until the average internal pH is within the range from 5.2 to 5.4.

5. The process of claim 1 in which said pasta filata cheese is pizza cheese.

6. A process for preparing pizza cheese curd ready for mixing, comprising:
   a. inoculating a batch of pasteurized cow's milk with a pasta filata starter culture providing an effective amount of *S. thermophilus* in admixture with an effective amount of a high-temperature-growing *Lactobacillus*;
   b. converting the milk batch to a mixture of curd and whey;
   c. cooking the curd-whey mixture at a temperature of 100° to 125°F. favorable to the growth of said *S. thermophilus* and said *Lactobacillus*;
   d. separating the resulting warm granular curd from the whey, said curd having an average internal pH of 5.5 to 6.2;
   e. contacting the warm curd with water having a lower temperature than the curd until the curd is cooled to at least 70°F; and
   f. holding the cooled granular curd in a cold storage room having an ambient air temperature below 60°F. but above the freezing temperature of the curd until the internal pH of the curd has decreased to 5.2 to 5.4 so that said curd is ready for mixing.

7. The process of claim 6 in which said starter culture is composed essentially of a mixture of *S. thermophilus* and *L. bulgaricus*.

8. A process for preparing pasta filata cheese curd ready for mixing, comprising:
   a. inoculating a plurality of separate batches of pasteurized cow's milk with a pasta filata starter culture providing an effective amount of *S. thermophilus* together with an effective amount of at least one high-temperature-growing *Lactobacillus*;
   b. converting the milk in each batch to a mixture of curd and whey;
   c. separately cooking the curd-whey mixtures at temperatures of 100° to 125°F. favorable to the growth of said *S. thermophilus* and said *Lactobacillus*;
   d. separating the resulting warm granular curd from the whey for each of said batches, said separated curd batches having average internal pH's of 5.5 to 6.2;
   e. introducing the separated warm curd from a plurality of said batches into a tank containing water maintained at a lower temperature than said warm curd, and cooling and intermixing the curd from said batches in said tank to produce a cooled blend of said curd, said cooling and intermixing being continued until said curd has a temperature below 80°F.; and
   f. holding the cooled curd blend in a cold storage room having an ambient air temperature above the freezing temperature of the curd and below 65°F.

until the average internal pH of the curd has decreased to 5.2 to 5.4.

9. The process of claim 8 in which the curd blends from a plurality of said batches are introduced into a further tank after completion of said cold storage room holding, and contacted with warm water therein while further intermixing said curd blends.

10. The process of claim 8 in which said cooled blended curd is introduced into a plurality of separate containers for said cold storage room holding, and thereafter such containers of curd of different blends are introduced into a warm-up tank, and contacted therein with warm water, while being intermixed to obtain further blending of the curd.

11. The process of claim 8 in which said cheese is pizza cheese, said starter culture is composed essentially of a mixture of S. thermophilus and L. bulgaricus, said warm curd is cooled to below 70°F. by contact with said water, said ambient air temperature in said cold storage room is maintained below 60°F., and said curd is held in said cold storage room until the average pH of the curd has dropped to a pH within the range from 5.2 to 5.4.

12. A process for preparing pasta filata cheese curd ready for mixing, comprising:
    a. inoculating a batch of pasteurized cow's milk with a pasta filata starter culture providing an effective amount of S. thermophilus together with at least one high-temperature-growing Lactobacillus;
    b. converting the milk batch to a mixture of curd and whey;
    c. cooking the curd-whey mixture at a temperature in the range from 100° to 125°F. favorable to the growth of said S. thermophilus and Lactobacillus;
    d. separating the resulting warm granular curd from the whey, said curd having an internal pH above 5.5 and below 6.2;
    e. washing and cooling the separated granular curd by contacting it with water having a lower temperature than the curd until the curd is cooled to at least 60°F.; and
    f. holding the washed and cooled granular curd at a nonfreezing temperature below 60°F. until the internal pH of the curd has decreased to a pH in the range from 5.5 to 5.1 suitable for mixing and stretching the curd to obtain pasta filata stringiness.

13. A process for preparing a pizza cheese curd ready for mixing, comprising:
    a. inoculating a batch of pasteurized cow's milk with a pasta filata starter culture providing an effective amount of S. thermophilus in admixture with an effective amount of a high-temperature-growing Lactobacillus;
    b. converting the milk batch to a mixture of curd and whey;
    c. cooking the curd-whey mixture at a temperature in the range of 100° to 125°F. favorable to the growth of said S. thermophilus and Lactobacillus;
    d. separating the resulting warm granular curd from the whey, said curd having an internal pH of substantially 5.6 to 5.9;
    e. washing and cooling the separated granular curd by contacting it with water having a lower temperature than the curd until the curd is cooled to below 60°F.; and
    f. holding the washed cooled granular curd at a temperature of 35° to 55°F. until the internal pH of the curd has decreased to substantially 5.2 to 5.4 so that said curd is ready for mixing.

14. A process for preparing pasta filata cheese curd ready for mixing, comprising:
    a. inoculating a plurality of separate batches of pasteurized cow's milk with a pasta filata starter culture providing an effective amount of S. thermophilus together with at least one high-temperature-growing Lactobacillus;
    b. converting the milk in each batch to a mixture of curd and whey;
    c. separately cooking the curd-whey mixtures at temperatures in the range of 100° to 125°F. favorable to the growth of said S. thermophilus and Lactobacillus;
    d. separating the resulting warm granular curd from the whey for each of said batches, said separated curd having an average internal pH above 5.5 and below 6.2;
    e. introducing the separated curd from a plurality of said batches into a tank, and washing, cooling, and intermixing the curd from said batches in said tank to produce a washed, cooled blend of said curd, said washing, cooling and intermixing being continued until the curd blend has been cooled to at least 60°F.; and
    f. holding said curd blend at a non-freezing temperature below 60°F. until the internal pH of the curd is decreased to a pH in the range of 5.5 to 5.1 suitable for mixing and stretching the curd to obtain pasta filata stringiness.

15. A process for preparing pasta filata cheese curd ready for mixing and stretching to impart pasta filata stringiness, comprising:
    a. inoculating a plurality of separate batches of cow's milk with a pasta filata starter culture, said culture providing lactic acid forming bacteria;
    b. converting the milk in each of said batches to a mixture of curd and whey;
    c. separately cooking the curd-whey mixtures to a temperature above 100°F. at which said starter culture bacteria continue to grow and reduce the pH of said curd by lactic acid formation, the pH of said curd at the conclusion of said cooking being at a pH substantially above a pH suitable for mixing said curd to impart pasta filata stringiness;
    d. separating the resulting warm granular curd from the whey for each of said batches;
    e. cooling the separated curd to a temperature of at least 80°F.;
    f. storing the cooled curd in a cold storage room having an ambient air temperature above the freezing temperature of the curd but below 65°F. until the average pH of the stored curd has reached the mix range of substantially pH 5.2 to 5.4; and
    g. prior to mixing and stretching said stored curd to impart pasta filata stringiness, blending together the curd from at least two of said batches to produce a curd blend.

16. The process of claim 15 in which curd from a plurality of said batches is subjected to said blending both before and after said storing in said cold storage room.

17. The process of claim 15 in which there are at least three of said batches and each batch of said curd is stored in said cold storage room without being blended with curd from another of said batches, and thereafter curd from at least three of said batches is blended together prior to said mixing and stretching.

* * * * *